C. G. Frushour,
Animal Trap.
No. 95,893. Patented Oct. 19. 1869.
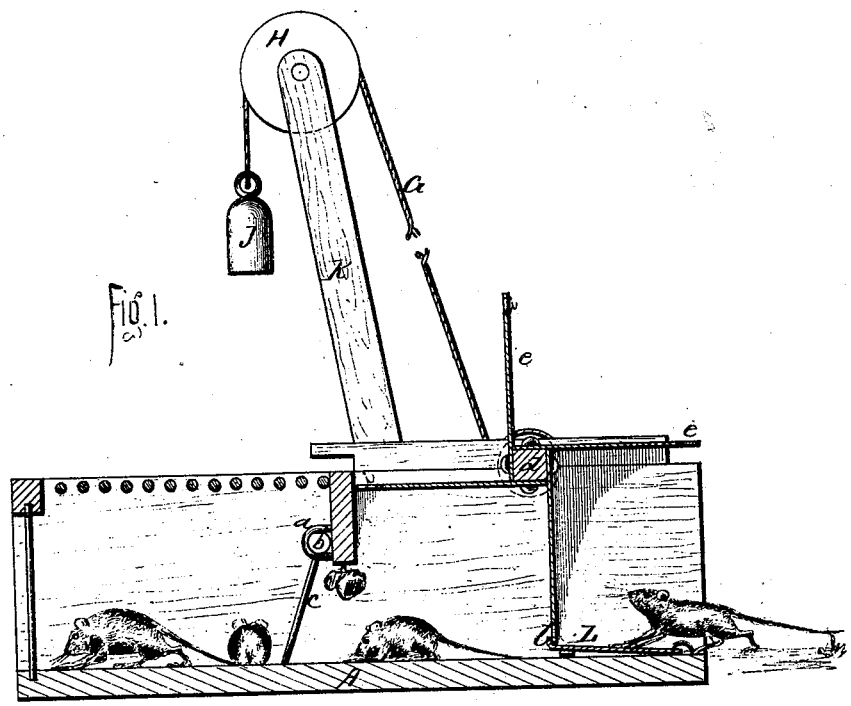
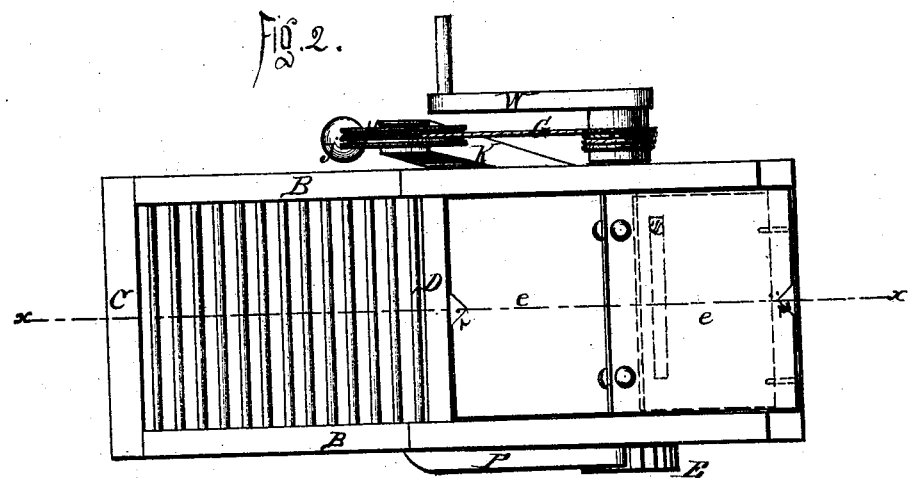
Witnesses:
Victor Hagmann
A. M. Tanner
Inventor:
C. G. Frushour
by Munn & Co
Attorneys

United States Patent Office.

CALVIN G. FRUSHOUR, OF LA GRO, INDIANA.

Letters Patent No. 95,893, dated October 19, 1869.

IMPROVED ANIMAL-TRAP.

The Schedule referred to in these Letters Patent and making part of the same.

*To all whom it may concern:*

Be it known that I, CALVIN G. FRUSHOUR, of La Gro, in the county of Wabash, and State of Indiana, have invented a new and useful Improvement in Animal-Traps; and I do hereby declare the following to be a full, clear, and exact description thereof, reference being had to the accompanying drawings, forming part of this specification, in which—

Figure 1 is a view in longitudinal section.

Figure 2 is a plan view.

My invention relates to that class of animal-traps especially designed for catching rats and mice, and which are provided with spring-treadles, and flanged or winged shafts, rotated by weights or other suitable power.

The invention consists in providing an aperture in each of the outer edges of the flanges or wings, as and for the purpose hereinafter set forth.

The frame of my trap is of an oblong rectangular form, made of any material preferred, and consisting of a bottom, A, sides B B, close-wired end C, any desired top, and transverse cross-bar D.

To this latter piece is attached, by eyes $a\ a\ a\ a$, two hinge-rods, $b\ b$, and to these are fastened wires $c\ c$, whose gravity will cause them, when lifted, to fall toward the bottom of the frame, and whose length is sufficient to make them catch upon it.

In the side-pieces B B is journalled a shaft, $d$, to whose central portion are affixed the radial flanges $e\ e\ e\ e$, and to one end thereof, the ratchet-wheel E, while to the other end is attached a fast pulley.

The ratchet-wheel is held in any desired position by a detent-pawl, F, and the pulley is made to rotate the shaft by means of the cord G, passing over the friction-pulley H and the weight I.

These latter are supported upon the upright K.

On the open end of frame is placed a spring treadle-plate, L, which has a raised catch, $l$, on its inner edge, and turns upon eyes near the other edge.

When the weight has been wound up, the tension of the cord G on the shaft $d$ will hold one of its wings or flanges $e$ in contact, at its lower edge, with the catch $l$ of the plate L.

Thus arranged, with bait affixed inside the box, the trap is ready for operation.

It is evident, that when the weight of a rat is sufficient to depress the spring-treadle, the flange $e$ will be released, and he will be immediately forced into the first or bait-chamber, whence he will pass, of his own accord, into the contiguous one, and thus be securely entrapped.

If, however, the animal which has been attracted by the bait be so small that its weight would fail to depress the treadle sufficiently to clear the flange $e$, of course no capture can result. It is in this respect that other analogous inventions have failed to perform their proper function.

To obviate this objection, I provide a notch, $i$, in the centre of each of the outer or lower edges of the flanges $e$. Thus, when the animal steps upon the treadle, if so small as not immediately to depress the same, he will naturally attempt to reach the bait, (which is brought into full view,) by forcing himself through the aperture formed by the notch. Very slight pressure upon the treadle, produced in this way, suffices to free the flange $e$, and the animal shares the same fate as a larger one.

This construction adapts my trap to catching both rats and mice which may be, respectively, of the largest or smallest size, which has hitherto been impossible in traps of substantially similar construction, (except in the particular indicated,) owing to the difficulty of graduating the spring-treadle to varying weight or pressure.

Having thus described my invention,

What I claim as new, and desire to secure by Letters Patent, is—

The combination of the notched flanges or wings $e$, with the spring-treadle L, constructed as herein shown and described.

The above specification of my invention signed by me, this 16th day of July, 1869.

C. G. FRUSHOUR.

Witnesses:
M. HOGAN,
WILLIAM HEDGER.